United States Patent
Lambrinos et al.

(10) Patent No.: US 10,266,061 B2
(45) Date of Patent: Apr. 23, 2019

(54) METHOD AND SYSTEM FOR SECURING A RENTAL VEHICLE, AND SECURE VEHICLE

(75) Inventors: Clément Lambrinos, Montreuil (FR); Aymeric Augustin, Ville d'Avray (FR); Raphael Barrois, Paris (FR); Julien Rouyer, Puteaux (FR); Sandrine Ressayre, Auffargis (FR); Franck Thieulent, Saint Ouen (FR)

(73) Assignee: BLUECARSHARING, Puteaux (FR)

( * ) Notice: Subject to any disclaimer, the term of this patent is extended or adjusted under 35 U.S.C. 154(b) by 730 days.

(21) Appl. No.: 14/129,350

(22) PCT Filed: Jul. 2, 2012

(86) PCT No.: PCT/FR2012/051527
§ 371 (c)(1),
(2), (4) Date: Mar. 14, 2014

(87) PCT Pub. No.: WO2013/001255
PCT Pub. Date: Jan. 3, 2013

(65) Prior Publication Data
US 2014/0379185 A1 Dec. 25, 2014

(30) Foreign Application Priority Data

Jun. 30, 2011 (FR) ...................................... 11 55914

(51) Int. Cl.
B60L 11/18 (2006.01)
G07B 15/00 (2011.01)
G07F 15/00 (2006.01)

(52) U.S. Cl.
CPC .......... B60L 11/1838 (2013.01); G07B 15/00 (2013.01); G07F 15/005 (2013.01);
(Continued)

(58) Field of Classification Search
CPC ... G07B 15/00; G07F 15/005; G07F 17/0057; B60L 11/1838
(Continued)

(56) References Cited

U.S. PATENT DOCUMENTS 6,947,881 B1  9/2005 Murakami et al.
2004/0073440 A1* 4/2004 Garbers et al. ................... 705/1
(Continued)

FOREIGN PATENT DOCUMENTS

JP 2010234925 A 10/2010

OTHER PUBLICATIONS

European Patent Office; Search Report in International Patent Application No. PCT/FR2012/051527 dated Oct. 2, 2012; 4 pages.
(Continued)

*Primary Examiner* — Aaron L Troost
(74) *Attorney, Agent, or Firm* — Dorton & Willis, LLP (57) ABSTRACT

The invention relates to a method (300) for securing an electric rental vehicle when returning/picking up the vehicle at a so-called rental site, said vehicle including at least one sensor for determining at least one state of an element of said vehicle, said method including the following steps: measuring (310, 320) at least one value of at least one parameter by said sensor means, comparing (310, 320) the value of said parameter with at least one predetermined value, and indicating (312, 322, 324) an anomaly if the value is not equal to the predetermined value. The invention also relates to a method for securing an electric rental vehicle when returning/picking up said vehicle, and to a secure vehicle.

16 Claims, 3 Drawing Sheets

(52) U.S. Cl.
CPC ....... *B60L 2250/20* (2013.01); *B60L 2270/30* (2013.01); *B60L 2270/34* (2013.01); *B60L 2270/36* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01)

(58) Field of Classification Search
USPC .......................................................... 701/22
See application file for complete search history.

(56) References Cited

U.S. PATENT DOCUMENTS

| | | |
|---|---|---|
| 2007/0143207 A1* | 6/2007 | Breen .............................. 705/40 |
| 2009/0057041 A1 | 3/2009 | Kamaga |
| 2009/0079388 A1 | 3/2009 | Reddy |
| 2010/0228405 A1* | 9/2010 | Morgal et al. .................... 701/2 |

OTHER PUBLICATIONS

French Patent Office; Search Report in French Patent Application No. 1155914 dated Jan. 12, 2013; 2 pages.

* cited by examiner

METHOD AND SYSTEM FOR SECURING A RENTAL VEHICLE, AND SECURE VEHICLE

The present invention relates to a method for securing a vehicle available for rental. It also relates to a system for securing such a vehicle and such a secured vehicle.

The field of the invention is the return and collection of electric vehicles available for rental, and in particular the securing of such electric vehicles, in particular during vehicle collection and return operations.

BACKGROUND

Vehicles that operate with one or more electric batteries and sites, called rental sites, enabling the collection of a rental vehicle or the return of a rented vehicle at the end of rental, are known.

These sites generally comprise a charging terminal used to charge the batteries of the rented vehicle while the vehicle is parked.

However, no method or system currently exists that makes it possible to protect the rented vehicle against acts of vandalism or damage that might occur during the handling of a vehicle during the phases of collecting the vehicle for rental or returning a vehicle at the end of rental.

A purpose of the invention is to overcome the abovementioned drawbacks.

Another purpose of the invention is to propose a method and system making it possible to protect the vehicle against acts of theft or vandalism.

Finally, a further purpose of the invention is to propose a method and a system making it possible to protect the vehicle against damage caused by incorrect handling of the vehicle during the vehicle collection and return operations on a rental site.

SUMMARY OF THE INVENTION

The invention proposes to achieve at least one of the abovementioned purposes through a method for securing an electric vehicle available for rental on the return/collection of said vehicle on a site, called the rental site, said vehicle comprising at least one sensor to determine at least one state of an element of said vehicle, said method comprising the following steps:
  measuring at least one value of at least one parameter by said sensor means,
  comparing the value of said parameter to at least one predetermined value, and
  signaling an anomaly, if the value is not equal to the predetermined value.

Thus, the method according to the invention makes it possible to monitor the state of the vehicle during vehicle return operations at the end of rental and/or during a vehicle collection operation at the start of rental.

The method according to the invention thus makes it possible to avoid damage to the vehicle caused by incorrect handling by the transmission of notification.

Furthermore, the method according to the invention makes it possible to ensure that the vehicle collection/return operation takes place successfully and as specified, and thus avoid the vehicle being left in a configuration in which the vehicle could be subject to acts of theft or vandalism.

Advantageously, for at least one parameter, the comparison of the measured value to a predetermined value can be carried out on a remote site, called the central site, said method also comprising the sending of said measured value to said central site.

The measured value can be sent directly to the remote site by the vehicle over a wireless network, such as the GPRS network.

In this case, the measured values can be sent to the remote device periodically, at the request of the remote device, or following a predetermined event, for example the identification of a user on the vehicle or a terminal at a charging station.

Of course, for at least one parameter, the comparison of the measured value to a predetermined value can be carried out by the charging terminal.

In any case, the measured value can be sent in the form of a data frame also comprising an identification number relating to the vehicle. The data can be sent over a communications network that is at least partially wireless, such as a GPRS network. The data can also be sent over a wired link.

The signaling step can comprise a step of emitting an audible and/or light signal on the vehicle, or on a terminal of a charging station, in particular a charging terminal with which the vehicle is associated. The signal is intended to warn the user. In the case in which the signal is transmitted on the vehicle, it can be a message displayed on the vehicle's on-board computer, for example. In the case in which the signal is transmitted on the charging station with which the vehicle is associated, it is a light or audible signal. This terminal can be recognized as it is directly or indirectly associated with the vehicle in a database stored at the central agency or site.

If the comparison step is not carried out by the element that transmits the warning signal, in particular in the case in which this element is the charging terminal, the signaling step is preceded by a step of transmitting a message to this element.

The signaling step can also and/or instead comprise the transmission of at least one item of notification data to the user or an operator.

The item of notification data is generally sent by the central site. If it is not this site that carries out the comparison step, this step is preceded by the transmission of a message from the element that carries out the comparison step, a priori the vehicle, to the central site.

The notification data can be transmitted to the user or operator on a mobile communication device held by the user or operator, in the form of an SMS, MMS, email, etc.

Of course, the same notification data or different data can be transmitted to different recipients.

The method according to the invention can also comprise a step of identifying at least one user by the reading of an identifier of said user on the rental site, to ensure that the user requesting a vehicle is a known user.

The method according to the invention can also, in addition to or instead of the above identification step, comprise a step of identifying at least one user by the reading of an identifier of said user by the vehicle, to ensure that the user attempting to access the vehicle is a previously authorized user.

The identification step(s) can be carried out using RFID identification means held by the user, which can be read by the different elements of the system. Other means of identification (key, barcode, entering information, etc.) can also be used.

The parameter measured can be a parameter providing information about the state of an opening of a vehicle, a connection of an electrical connector on the vehicle to an electrical connector on a charging terminal, or the state of a lid or cover giving access to such an electrical connector.

Each of the sensor elements can be connected to a control module within the vehicle that centralizes all of the values sent by all of the sensor elements. Such a module can also send other commands.

When the comparison step is not carried out by the vehicle, the control module can send each of the items of data over a communications network.

It will be noted that the method can comprise a step of determining a configuration (for example, collection or return of the vehicle) and, depending on the result of this step, a step of determining the parameter(s) to be compared and/or predetermined values with which to compare them during the comparison step.

For example, when the vehicle is collected, once the doors have been unlocked, it is verified that the cable is disconnected from the vehicle and that the vehicle's charging lid is closed; on the return thereof, it is verified that the cable is connected and that the doors and charging lid are closed. To this end, the comparison of different parameters must be requested during the comparison step.

The configuration determination step is usually carried out by the central site on the basis of the data stored in its databases. It can in particular be combined with the user identification step, and consist of verifying if a vehicle is associated with the user in the databases or the rental start time.

Furthermore, it can also be envisaged that, when a measured value does not correspond to the predetermined value, the central site transmits data to the vehicle, in particular the vehicle's control module, such data triggering an activation signal. Such a signal can be used to carry out some of the actions not carried out by the user, for example closing an opening or a charging lid, or preventing the vehicle from starting until the anomaly has been rectified.

According to another aspect of the invention, a system for securing an electric vehicle available for rental on the return/collection of said vehicle on a site, called the rental site, is proposed, said system comprising:
  at least one sensor means placed in said electric vehicle and arranged to detect the state of at least one element of said vehicle,
  means, called comparison means, of comparing at least one value of at least one parameter measured by said sensor means to at least one predetermined value, and
  means of signaling an anomaly, capable of being activated if the measured value does not correspond to the predetermined value.

The signaling means can in particular be means of emitting an audible and/or light signal, preferably arranged on the charging terminal or the vehicle, or means of transmitting at least one item of notification data to a user or an operator.

Said at least one element can be an opening of the vehicle, an electrical connector on the vehicle, or a lid or cover providing access to such an electrical connector.

Advantageously, the comparison means can be placed on a remote site relative to the rental site, said system also comprising means of transmitting data from said vehicle to said remote site, for example means of transmission over a wireless communications network such as the GPRS network.

Advantageously, the system according to the invention can also comprise means of reading an identifier of a user on the rental site and/or the vehicle.

The reading means can comprise means of reading a biometric identifier or an RFID card, among others.

The sensor means can comprise at least a force sensor, a position sensor, a pilot wire providing information about the establishment of an electrical connection with a charging terminal, or at least the mechanical locking of an electrical connector with at least one other electrical connector.

According to a further aspect of the invention, an electric vehicle capable of being secured by the method or system according to the invention is proposed.

The electric vehicle according to the invention comprises:
  at least one electrical connector capable of engaging with at least one electrical connector of a charging terminal to establish an electrical connection to charge at least one battery of said vehicle, and
  at least one sensor arranged to detect the state of at least one element of said vehicle.

The vehicle according to the invention can also comprise means of transmitting/receiving data to/from a remote site, for example over a wireless communications network such as the GPRS network and/or means of emitting a light or audible signal.

Advantageously, the vehicle according to the invention can also comprise at least one means, for example RFID or biometric, of reading a user's identifier.

In addition, the vehicle according to the invention can also comprise at least one sensor arranged to detect the state:
  of an electrical charging connector on said vehicle,
  of a cover used to access an electrical charging connector, and/or
  of an opening of said vehicle.

The invention applies particularly to the management of a fleet of interchangeable electric vehicles intended for rental and for which a plurality of rental stations is provided.

BRIEF DESCRIPTION OF THE FIGURES

Other advantages and characteristics of the invention will become apparent on examination of the detailed description of an embodiment which is in no way limitative, and the attached diagrams, in which.

Of course, the embodiments which will be described below are in no way limitative. In particular, variants of the invention can be envisaged that comprise only a selection of the features described below in isolation from the other features described, if this selection of features is sufficient to provide a technical advantage or to distinguish the invention from the prior art. This selection comprises at least one preferably functional feature without structural details, or with only some of the structural details if this part alone is sufficient to provide a technical advantage or to distinguish the invention from the prior art.

In particular, all of the variants and embodiments described can be combined if there is no technical reason preventing this combination.

DETAILED DESCRIPTION

Figure 1:
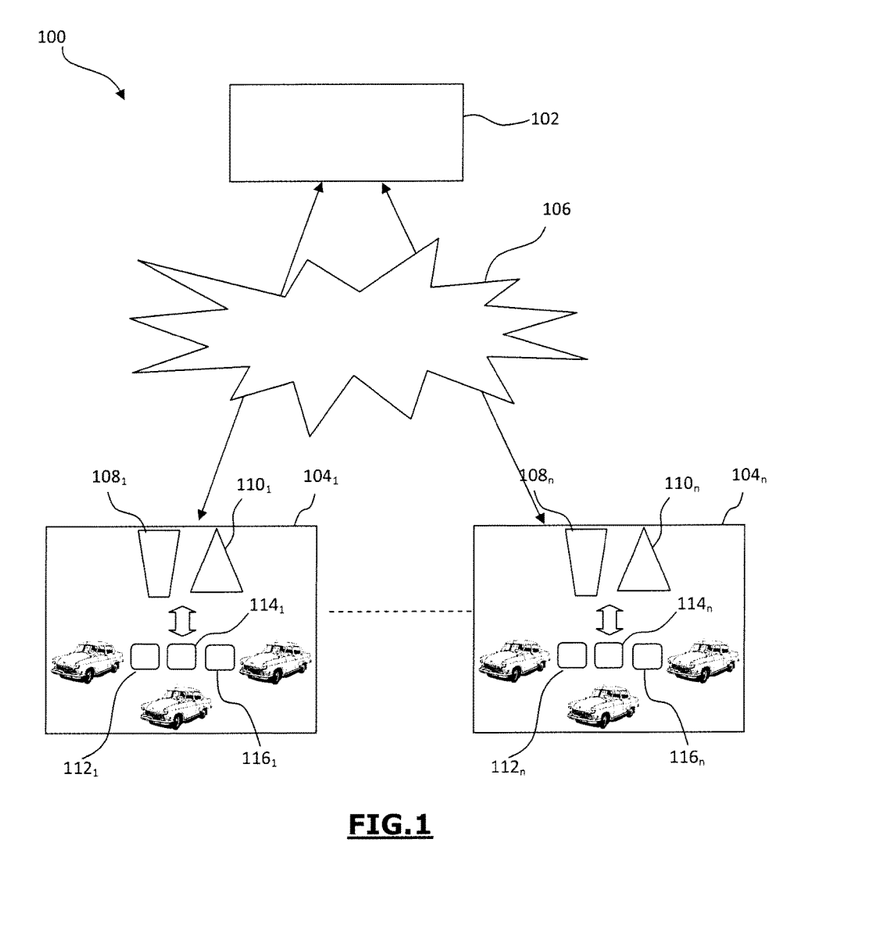
FIG. 1 is a diagrammatic representation of a management system for a fleet of vehicles available for rental.

FIG. 1 is a diagrammatic representation of an overall management system for a fleet of electric vehicles available for rental.

The system 100 shown in FIG. 1 comprises a central site 102 (also called central agency in the rest of the description) connected to several sites—or stations—$104_1$-$104_n$, called rental sites, over a wireless communications network 106, for example GPRS, or a wired network, for example a DSL network. Preferably, each station is connected to the central site via two separate networks, which enables continuous connection even if one of the networks fails.

Each rental station comprises a subscription terminal 108 for registering new subscribers, a rental terminal 110 for renting a vehicle and several charging terminals 112-116, each charging terminal being capable of charging a vehicle equipped with an electric battery at a parking space.

The central site 102 can be connected directly to each of the terminals of a rental station 104 over the network 106 or only to the subscription terminal and/or the rental terminal and/or the charging terminals 112-116.

At least two terminals of a rental station are connected to each other over a wired connection (not shown).

The central site 102 is also arranged to connect to an electric vehicle comprising a data connector connecting with one or more elements of the vehicle and/or a user communication interface, via a GPRS network. Each vehicle is therefore equipped with a GSM chip.

The central site 102 is also arranged to exchange information with a mobile communications device such as a PDA, a mobile phone, etc., held by an operator of the rental service and also connected to the central site via a GPRS network.

The system makes it possible to manage a plurality of vehicles each comprising a control unit capable of communicating with the central agency and with different elements of the vehicle, and a user interface.

Users are capable of interacting with the different terminals and with the different elements of the vehicles. Furthermore, the vehicle rental service with the system according to the invention can also be carried out with the help of the operators and their mobile terminal such as a PDA, which can intervene in the service.

As explained above, the general principle of the invention is as follows:
  indication by a user to an element of a rental site, in particular a rental terminal or a charging terminal or a subscription terminal, that this user wishes to collect a vehicle for rental or return a vehicle at the end of rental,
  verifying the status of one or more elements of the vehicle,
  if the status of at least one of these elements does not comply with a predetermined status, the user or an operator is warned in the form of a notification until the status of all of the elements of the vehicle complies with a predetermined status.

The element the status of which is verified is as follows:
  vehicle doors: are they closed on return of the vehicle, and/or
  vehicle lid receiving an electrical recharging cable: is it closed on collection or return of the vehicle, and/or
  electrical recharging cable: is it connected/disconnected correctly on vehicle return/collection.

The first two points can be verified by querying a control module of the vehicle controlling the closing and opening of the vehicle's openings, for example by means of an RFID reader, which can also carry out user identification, in which case the opening or closing order is only executed if the user is recognized.

The closing of the lid can also be verified by means of a force or position sensor.

The connection/disconnection of the electrical cable can be verified by means of a pilot wire or a position sensor. The connection could also be verified by means of the mechanical locking of the cable in the vehicle connector, which would make it possible to ensure the correct connection of the different connectors.

The indication step can in particular comprise an identification step. This step can be carried out directly on a charging terminal by means of identification means such as an RFID card. The charging terminal can comprise an RFID reader. This step could however be carried out by other means, such as for example identification on the rental terminal or by entering information with a keyboard.

The identification step can involve the participation of the central site, which comprises a database relating to users' access rights. The charging terminal or the rental terminal or the subscription terminal sends to the central site the user's identifier and the central site returns data about this user, for example, a rental authorization, a notification that rental is underway, etc.

With regard to verifying the status of the vehicle elements, this verification can be carried out at the central site or on the vehicle.

In the case in which this step is carried out by the central site, the vehicle can send the information relating to the sensor periodically to the central site.

Preferably, the central site queries the vehicle and therefore the vehicle sensors a predetermined time, for example 2 minutes, after the signaling step has taken place. In response to the query, the vehicle transmits the state of the sensors, either a binary or numerical value measured by the sensors, or the control module, relating to the element of the vehicle the state of which is being monitored. The central site compares the measured values to predetermined normal values stored in a database and determines whether or not there is an anomaly on the vehicle.

In the case in which this step is carried out by the vehicle, the vehicle control unit gathers the values relating to the state of the sensors monitoring the vehicle elements, for example via the control module in particular when it controls these, as can in particular be the case with regard to the opening/closing of the doors, and compares them to predetermined values. The control module can in this case send feedback to the central site if it detects an anomaly.

The user or an operator can be warned in several ways, which can optionally be combined:
  warning by SMS, email or phone call on the user's or operator's mobile phone,
  warning via an interface on the vehicle, and/or
  warning via an audible or light signal on the charging terminal or the rental terminal.

These steps can take place when a vehicle is collected. The locking of the connection lid and/or the absence of a cable in the vehicle's connector is then preferably verified. Preferably, the message is in this case displayed on interface means on the electric vehicle. It can even be envisaged to prevent the electric vehicle from starting if the status of certain elements of the vehicle is not considered to be normal.

These steps can also take place when a vehicle is returned, in which case the locking of the lid and doors and the connection of the cable to the vehicle are preferably verified. The message is then sent to the user on his mobile phone, preferably by SMS. It can also be sent to a rental service operator.

Figure 2:
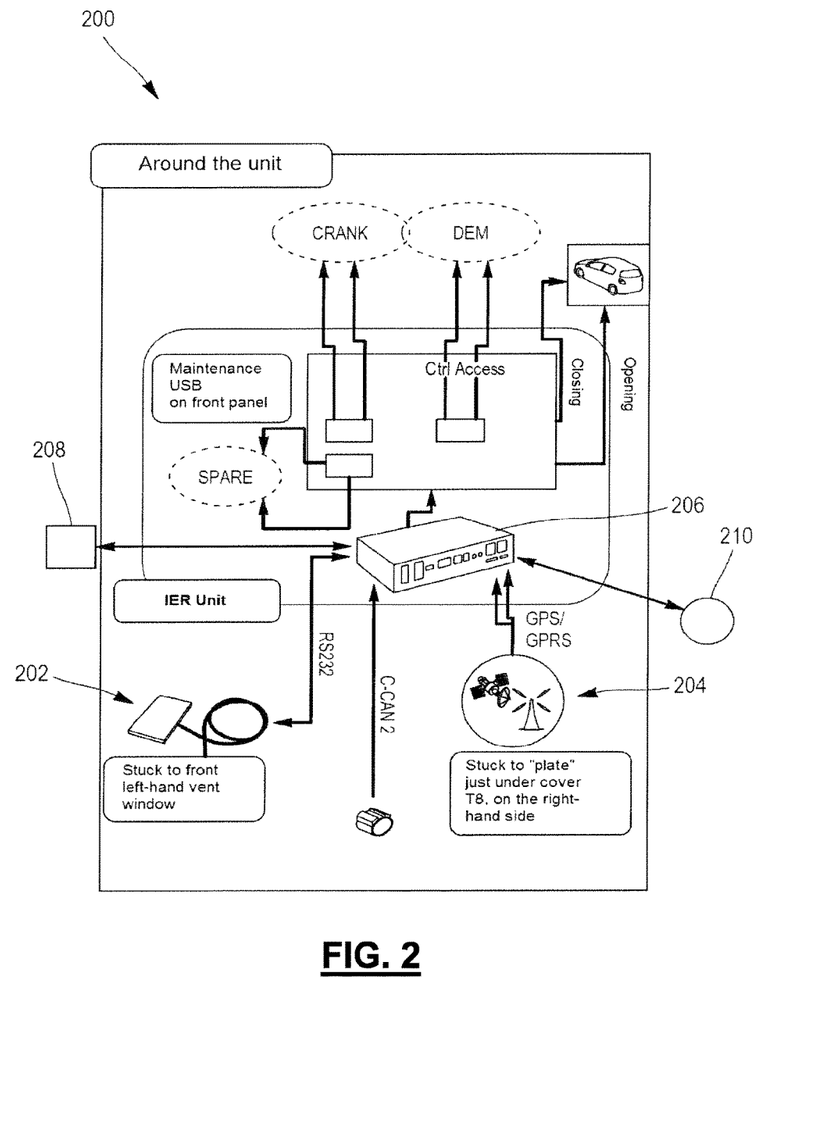
FIG. 2 is a diagrammatic representation of an example of a securing system according to the invention.

An example of a securing system according to the invention will now be described with reference to FIG. 2.

The system comprises means of reading a means of identification of a user. This means is made up of one or more RFID readers located in different positions on the vehicle. In the example shown in FIG. 2, the system 200 comprises an RFID reader module 202 stuck to the front left-hand vent window of the vehicle.

This or these RFID readers can in particular be used to trigger the opening or closing of the vehicle openings (doors, luggage compartment, lid) simultaneously or separately, after the validity of the identifier has been verified with the central site after verifying that the vehicle has been allocated to this user by the central site. Preferably, the vehicle comprises a reader for opening the doors and luggage compartment and a specific reader for opening the connection lid.

The vehicle comprises a GPRS antenna 204 that enables the vehicle to communicate with the central site and a unit 206 forming a control module connected to the RFID reader and the antenna, as well as to the different elements of the vehicle to enable the control thereof and connecting these different elements. The unit 206 also comprises data storage means.

The vehicle also comprises an interface with the user formed by an on-board computer. It is also capable of communicating with the central site.

Furthermore, the system 200 also comprises at least one sensor 208, such as a force sensor, detecting the state (open/closed) of at least one opening of the vehicle, such as a door or luggage compartment. The sensor(s) 208 are connected to the control module and provide the control unit with information about the state of the openings, for example in the form of a binary signal.

The system 200 also comprises a sensor 210, such as a pilot wire and/or locking means, detecting the state (connected/disconnected) of a charging connector of a battery of the vehicle and/or the state (open/closed) of an access lid to such a connector. The sensor(s) 210 are connected to the control unit and provide the control unit with information about the state of the connector and/or the lid.

An example of a method according to the invention will now be described with reference to FIG. 3.

The method 300 according to the invention comprises a first identification step 302 during which the user identifies himself to the rental site, in particular by passing an RFID card over a reader on a charging terminal corresponding to a parking space containing the vehicle that he wishes to collect or that he has just returned. During this step, as explained above, the identifier read is transmitted to the central site, which searches in databases that it stores and transmits data to the rental site in return (rental authorization, etc.).

The central site verifies during a step 304 if the user wishes to rent a vehicle or is returning a vehicle.

If the user wishes to return a vehicle, an end of rental process is initiated in step 306.

Then, after a predetermined time, for example 2 minutes, the central site sends the vehicle a command to verify the status of the different elements of the vehicle during a step 308. The values are then verified during a verification step 310.

In a variant, the verification step 310 can be triggered by a request from the user, in particular in the form of a start request.

The central site can in particular transmit at the same time as his request, the values that the different elements must verify, depending on the circumstances, for example cable connection OK if this is the end of the rental but cable connection NOK if this is the start of the rental. The vehicle can store these values temporarily or permanently in the storage means of the control unit. If the vehicle is not capable of determining by itself the values that it must verify, it can communicate with the central site to determine them, after sending a request to the central site and receiving its response.

The control module then retrieves the different values associated with the monitored elements, for example a numerical or binary value, and compares them to predetermined normal values for these elements.

If the central site does not receive a response after a predetermined time, it can also alert an operator.

If all of the values are compliant, the rental is ended.

If one of the sensor values does not comply with the expected value, the vehicle generally warns the central site, which, during a step 312, transmits a warning notification to the user by means of the vehicle or a user's mobile communications device or via a terminal on the rental site.

If the user wishes to rent a vehicle, a step of verifying the user's identity is carried out during a step 314. If the user is not authorized to rent the vehicle, the process is ended. If the user is authorized to rent the vehicle, a start of rental procedure is initiated in step 316.

After a predetermined time, for example 2 minutes, the central site sends the vehicle a command to verify the status of the different elements of the vehicle during a step 318. As explained above, these values are selected depending on the collection configuration of the vehicle. The values are then verified during a verification step 320.

If all the values comply, the rental starts and a start of rental or vehicle start signal can be transmitted during an optional step 322.

If one of the sensor values does not comply with the expected value, the vehicle generally warns the central site, which, during a step 324, transmits a warning notification to the user via the vehicle or a user's mobile communications device or via a terminal on the rental site.

After a predetermined time, for example 2 minutes, step 320 is repeated until all of the measured values are normal.

In a first embodiment (in particular on return of the vehicle), during the warning step (or signaling an anomaly), the central agency then composes a message to the user indicating in particular the type of anomaly and/or the address of the rental site and inviting him to go to this rental site to correct the anomaly. This message is sent to the user by SMS. This is carried out by a communication unit on the central site comprising in particular a GSM chip that enables it to communicate with any mobile phone. The user's mobile phone number is found in an internal database at the central agency.

It will be noted that the user can still open the vehicle until it is rented by another user. However, he is no longer authorized to start the vehicle.

It can also be envisaged that the message is sent to an operator of the rental service if the user's number is not known or if he cannot be reached. It can also be envisaged that the rental end time remains unchanged in the event that the user comes to rectify the anomaly within a given time period, for example 15 minutes, but the rental end time is changed to the time at which the anomaly is rectified if the user does not come to rectify it. To this end, a counter can be activated at the central site or in the vehicle control unit. It can also be envisaged that a message is sent to an operator of the system at the end of the predetermined time period to solve the problem.

If the user does not manage to solve the problem due to an internal failure of the vehicle, he can ask for help from an operator and/or state this on the rental terminal/vehicle, in which case the rental end time is not changed and an operator is called for maintenance. The vehicle and the parking space in which it is located can also be declared unavailable.

In a second embodiment (in particular on collection of the vehicle), during the warning step, the central agency also composes a message to the PC on board the vehicle. This message could also be sent by the control unit but, in the preferred embodiment of the invention, the control module and the vehicle interface means are only capable of communicating through the central site, which makes it possible to prevent one or more items of information from getting through.

It can also be envisaged that the control unit transmits a control signal preventing the vehicle from starting until the anomaly is rectified. This signal can be activated by the recording of the anomaly by the control unit or by an item of data sent by the central agency. The starting of the vehicle can be dependent on a plurality of start signals (one or more OK signals transmitted by the control module+OK signal sent by a key or start button, for example). This would then make it possible to ensure that the user cannot start without having prepared the vehicle correctly.

Similarly, if the user does not manage to rectify the anomaly due to an internal failure of the vehicle, he can request help from an operator and/or state this on the rental terminal. In this case, the rental is cancelled and he is allocated another vehicle. The vehicle and the parking space in which it is located can also be declared unavailable.

Figure 3:
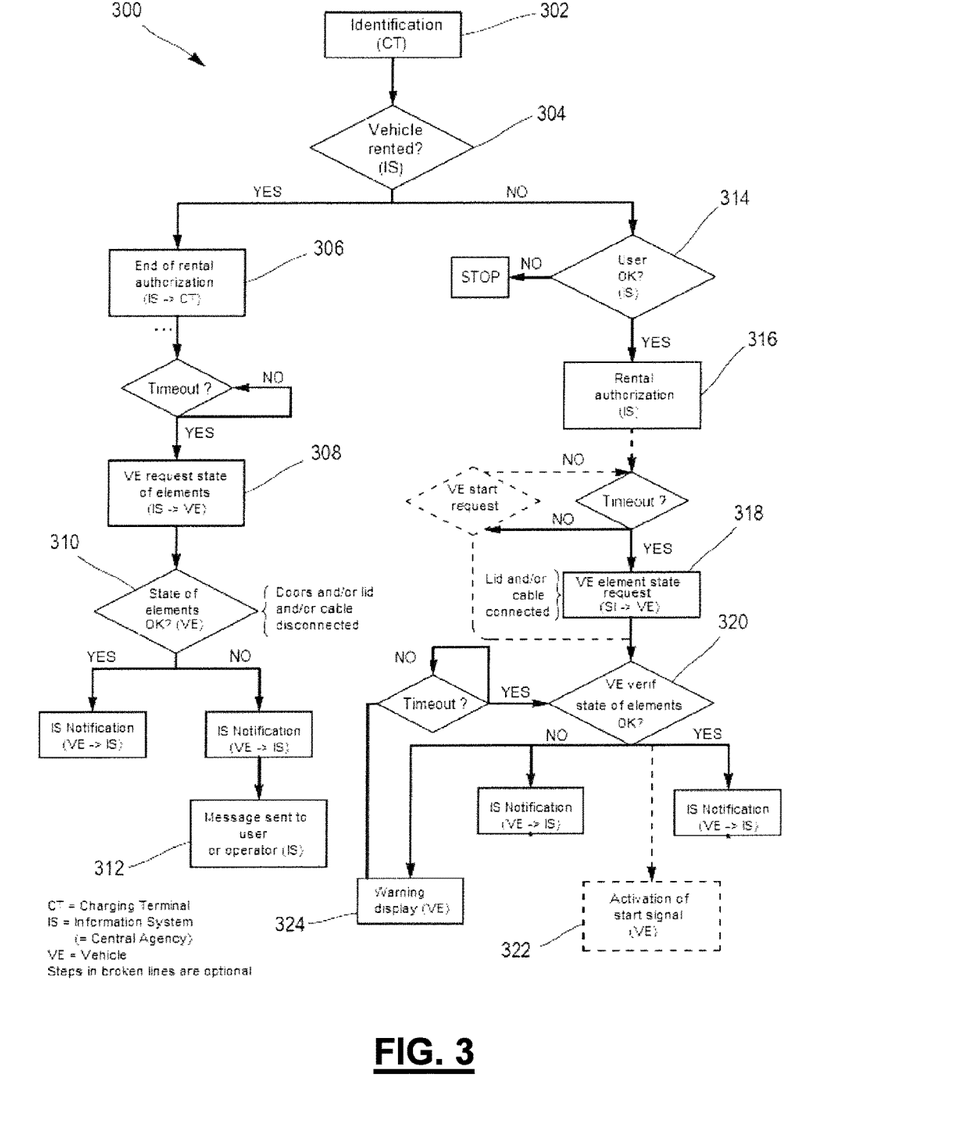
FIG. 3 is a diagrammatic description of an example of a method according to the invention.

The steps shown in broken lines in the method shown in FIG. 3 are optional.

Of course, the invention is not limited to the examples that have just been described.

What is claimed is:

1. A method for securing an electric vehicle available for rental on the return/collection of said vehicle at a rental site said vehicle comprising at least one sensor to determine at least one state of an element of said vehicle, said method comprising the following steps carried out during a return operation of the vehicle at the end of rental and/or during a collection operation of the vehicle at the start of rental:
    measuring at least one value of at least one parameter by the at least one sensor;
    comparing the at least one value of the at least one parameter to at least one predetermined value;
    signalling an anomaly, if the at least one value of the at least one parameter is not equal to the at least one predetermined value; and
    if no anomaly is signaled, completing the return operation and/or collection operation.

2. The method according to claim 1, wherein for the at least one parameter, the comparison of the at least one value of the at least one parameter to the at least one predetermined value can be carried out at a central site, said method also comprising the sending of the at least one value of the at least one parameter to said central site.

3. The method according to claim 1, wherein the signalling step comprises a step of emitting at least one of a light signal or an audible signal on the vehicle or on a terminal of a charging station associated with the vehicle.

4. The method according to claim 1, in which the signalling step comprises transmitting at least one item of notification data to a user of the vehicle or an operator of a rental service associated with the vehicle.

5. The method according to claim 1, further comprising:
    identifying user of the vehicle by reading an RFID identifier of said user at the rental site, by the vehicle, or a combination thereof.

6. The method according to claim 1, in which the at least one parameter measured relates to the state of an opening of a vehicle, a connection of an electrical connector on the vehicle to an electrical connector on a charging terminal, or the state of a lid or cover giving access to such an electrical connector.

7. The method according to claim 1, further comprising a step of determining a configuration and, depending on the result of this step, a step of determining the at least one parameter to be compared and/or the at least one predetermined values with which to compare the at least one parameter during the comparison step.

8. The method according to claim 1, further comprising receiving one or more items of data transmitted to the vehicle, the one or more items of data being capable of controlling the triggering of an activation signal, in particular if the at least one value of the at least one parameter is not equal to the at least one predetermined value.

9. An electric vehicle capable of being secured by the method according to claim 1, further comprising:
    at least one electrical connector capable of engaging with at least one electrical connector of a charging terminal to establish an electrical connection to charge at least one battery of said vehicle, and
    at least one sensor arranged to detect the state of at least one element of said vehicle.

10. The vehicle according to claim 9, wherein the at least one sensor is arranged to detect the state of at least one of:
    an electrical charging connector on said vehicle,
    a cover used to access an electrical charging connector, or
    an opening of said vehicle.

11. The method according to claim 1, wherein the at least one sensor includes a force sensor located proximate an opening defined by the vehicle, and wherein the at least one parameter includes whether a door of the vehicle is in an open state or a closed state, the method further comprising:
    determining, by the force sensor, whether the door is in the open state or the closed state; and
    signaling the anomaly if the door is in the open state during the rental operation or the collection operation.

12. The method according to claim 1, wherein the at least one sensor includes a force sensor located proximate an opening defined by the vehicle, and wherein the at least one parameter includes whether a luggage compartment of the vehicle is in an open state or a closed state, the method further comprising:
    determining, by the force sensor, whether the luggage compartment is in the open state or the closed state; and
    signaling the anomaly if the luggage compartment is in the open state during the rental operation or the collection operation.

13. The method according to claim 1, wherein the at least one sensor includes a force sensor located proximate a charging connector, and wherein the at least one parameter includes whether the charging connector is in a connected state or a disconnected state, the method further comprising:
    determining, by the force sensor, whether the charging connector is in a connected state or a disconnected state; and
    signaling the anomaly if the charging connector is in the disconnected state during the rental operation or the collection operation.

14. The method according to claim 1, wherein the at least one sensor includes a force sensor located proximate an access lid of a charging connector, and wherein the at least one parameter includes whether the access lid is in an open state or a closed state, the method further comprising:
   determining, by the force sensor, whether the access lid is in a open state or a closed state; and
   signaling the anomaly if the access lid is in the open state during the rental operation or the collection operation.

15. The method according to claim 1, further comprising:
   in response to signaling the anomaly, emitting a light from one of the vehicle or a charging station associated with the vehicle.

16. The method according to claim 1, further comprising:
   in response to signaling the anomaly, emitting a sound from one of the vehicle or a charging station associated with the vehicle.

\* \* \* \* \*